United States Patent
Enevoldsen et al.

(10) Patent No.: US 11,125,215 B2
(45) Date of Patent: Sep. 21, 2021

(54) SYSTEM AND METHOD FOR DETERMINING SOILING STATE OF A WIND TURBINE ROTOR BLADE

(71) Applicant: SIEMENS GAMESA RENEWABLE ENERGY A/S, Brande (DK)

(72) Inventors: Peder Bay Enevoldsen, Vejle (DK); Peter Fuglsang, Vejle (DK); Alejandro Gomez Gonzalez, Aarhus (DK); Jesper Monrad Laursen, Silkeborg (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 216 days.

(21) Appl. No.: 16/486,760

(22) PCT Filed: Dec. 8, 2017

(86) PCT No.: PCT/EP2017/082066
§ 371 (c)(1),
(2) Date: Aug. 16, 2019

(87) PCT Pub. No.: WO2018/149533
PCT Pub. Date: Aug. 23, 2018

(65) Prior Publication Data
US 2019/0368470 A1 Dec. 5, 2019

(30) Foreign Application Priority Data
Feb. 20, 2017 (DE) .................... 10 2017 202 711.8

(51) Int. Cl.
F03D 17/00 (2016.01)
(52) U.S. Cl.
CPC .......... F03D 17/00 (2016.05); F05B 2240/21 (2013.01); F05B 2260/80 (2013.01)

(58) Field of Classification Search
CPC ........ F05D 1/0675; F05D 17/00; F05D 80/55; F05D 2240/306; F05D 2240/304; F05B 2240/21; F05B 2260/80
See application file for complete search history.

(56) References Cited

U.S. PATENT DOCUMENTS

| 4,674,950 A | 6/1987 | Erickson |
| D587,610 S | 3/2009 | Benning |

(Continued)

FOREIGN PATENT DOCUMENTS

| CN | 101603500 A | 12/2009 |
| CN | 102282471 A | 12/2011 |

(Continued)

OTHER PUBLICATIONS

Office Action in corresponding Chinese Patent Application No. 201780089817.2 dated Jan. 4, 2021. 8 pages.

(Continued)

Primary Examiner — Ninh H. Nguyen
(74) Attorney, Agent, or Firm — Schmeiser, Olsen & Watts LLP

(57) ABSTRACT

Provided is a system for determining a soiling state of a wind turbine rotor blade. The system includes a pressure sensor adapted to measure a plurality of pressure values corresponding to a plurality of different heights above a trailing edge region of the wind turbine rotor blade, and a processing unit in communication with the pressure sensor and adapted to determine the soiling state of the wind turbine rotor blade by estimating an air flow velocity distribution above the trailing edge region of the wind turbine rotor blade based on the plurality of pressure values. Furthermore, a corresponding method of determining a soiling state of a wind turbine rotor blade is described.

14 Claims, 4 Drawing Sheets

(56) References Cited

U.S. PATENT DOCUMENTS

| | | | |
|---|---|---|---|
| 8,408,871 B2* | 4/2013 | Herr | F03D 7/0224 |
| | | | 416/37 |
| 9,297,264 B2* | 3/2016 | Hotto | F03D 17/00 |
| 9,335,229 B2* | 5/2016 | Baker | G01P 5/14 |
| 9,658,124 B2* | 5/2017 | Drack | F03D 17/00 |
| 2011/0246094 A1 | 10/2011 | Olesen | |
| 2014/0202233 A1 | 7/2014 | Itaya et al. | |

FOREIGN PATENT DOCUMENTS

| | | |
|---|---|---|
| CN | 103782160 A | 5/2014 |
| CN | 105424972 A | 3/2016 |
| EP | 2133562 A2 | 12/2009 |
| EP | 3073241 A1 | 9/2016 |
| EP | 3115599 A1 | 1/2017 |

OTHER PUBLICATIONS

Office Action in corresponding Chinese Patent Application No. 201780089817.2 dated May 25, 2020. 20 pages.
International Search Report for application No. PCT/EP2017/082066 dated Apr. 19, 2018.

* cited by examiner

SYSTEM AND METHOD FOR DETERMINING SOILING STATE OF A WIND TURBINE ROTOR BLADE

CROSS-REFERENCE TO RELATED APPLICATIONS

This application claims priority to PCT Application No. PCT/EP2017/082066, having a filing date of Dec. 8, 2017, which is based on German Application No. 10 2017 202 711.8, having a filing date of Feb. 20, 2017, the entire contents both of which are hereby incorporated by reference.

FIELD OF TECHNOLOGY

The following relates to the field of wind turbines, in particular a system for determining a soiling state of a wind turbine rotor blade and a method of determining a soiling state of a wind turbine rotor blade.

BACKGROUND

The soiling state of a wind turbine rotor blade, i.e. the aggregation of various materials (such as dirt, salt or ice) on the rotor blade surface during operation, has a big impact on the aerodynamic performance of the wind turbine. A direct consequence of leading edge soiling is the increase of drag of the airfoil sections and potentially a loss of aerodynamic lift. As a consequence of this, the power output of the turbine is reduced. Furthermore, several other secondary impacts of soiling are present such as (a) reduction of the so-called stall-margin (i.e. the amount, in degrees, which separates the operational point—angle of attack—from the point of stall of the airfoils); (b) increase of noise; and (c) added uncertainty in power curve measurements, among others. With regard to the latter, wind turbine manufacturers usually apply the restriction on power curves that the blades should be substantially clean. Thus, soiling adds measurement noise to the power curve measurement. Depending on the degree of soiling, the power output of a turbine may fall by several percent, e.g. by 3-6%.

An effect which is related to soiling in terms of its consequences is leading edge erosion. Although different in nature, the effects of leading edge erosion both on the aerodynamic performance as well as on the acoustic performance of the turbine are similar as those of soiling.

Accordingly, there is a need for determining the soiling state of a wind turbine rotor blade.

SUMMARY

According to a first aspect of the invention, a system for determining a soiling state of a wind turbine rotor blade is provided. The system comprises (a) a pressure sensor adapted to measure a plurality of pressure values corresponding to a plurality of different heights above a trailing edge region of the wind turbine rotor blade, and (b) a processing unit in communication with the pressure sensor and adapted to determine the soiling state of the wind turbine rotor blade by estimating an air flow velocity distribution above the trailing edge region of the wind turbine rotor blade based on the plurality of pressure values.

This aspect of the invention is based on the idea that the soiling state of the rotor blade is determined indirectly by estimating the air flow velocity distribution above the trailing edge region of the rotor blade. When soiling occurs at the leading edge of the rotor blade, the thickness of the boundary layer of the airfoil at the trailing edge will increase correspondingly, which in turn causes a change in the air flow velocity distribution, i.e. in the air flow velocity as a function of the height above the rotor blade. Thus, by e.g. comparing the estimated air flow velocity distribution with an expected distribution (corresponding to a clean or non-soiled rotor blade at the given operating conditions, such as angle of attack), it can be determined whether and to which extent (e.g., minor, medium or strong) the rotor blade is soiled.

In the present context, the term "soiling" may in particular denote an aggregation of material at the leading edge of the rotor blade, such as (i) accumulation of dirt and dust at the leading edge and in the fore sections of the suction side and pressure side; (ii) accumulation of dead bugs close to the leading of the blade; (iii) accumulation of small layers of ice at the leading edge; and (iv) accumulation of small layers of salt crystals at the leading edge.

In addition to soiling, rotor blade surface degradation (erosion) will result in similar impact on performance. Hence, the system may also be used to detect rotor blade erosion (and to generate a corresponding warning of high erosion level).

The pressure sensor is configured to measure the stagnation pressure (i.e. the pressure which the fluid builds up when being slowed down to a speed of zero at the measurement location) in each of a plurality of positions above a trailing edge region (i.e. a part of the rotor blade surface near the trailing edge). Accordingly, each pressure value represents the (stagnation) pressure in one of a plurality of heights above the trailing edge region of the rotor blade.

The processing unit receives the pressure values from the pressure sensor and uses them to estimate the air flow velocity distribution above the trailing edge region. Here, the term "estimating" should be understood broadly. In particular, the estimation may not involve a direct calculation (or estimation) of actual flow velocity values but rather an estimation of the velocity distribution, i.e. the change (or rate of change) in flow velocity as a function of height above the rotor blade. The term "estimating" can also be understood e.g. as being above or below a predetermined threshold value for stagnation pressure. The estimation can also be based on the difference pressure between the plurality of measurement heights.

The flow velocity distribution under ideal conditions (clean rotor blade) is known (from measurements and/or simulations) and will in particular be characterized by a certain gradient value corresponding to the transition from a high flow velocity at a certain height above the rotor blade surface to zero flow velocity at the rotor blade surface. This gradient value is thus a measure for the thickness of the boundary layer, i.e. a large gradient value (steep transition) corresponds to a thin boundary layer while a smaller gradient value (less steep transition) corresponds to a thicker boundary layer. Thus, by comparing the estimated flow velocity distribution with the known distribution, it can be determined whether and to which extent soiling is present.

According to an embodiment of the invention, the processing unit is adapted to calculate a set of differential pressure values based on the plurality of pressure values and to estimate the air flow velocity distribution based on the set of differential pressure values.

Since a difference in flow velocity (between two measurement points) will result in a corresponding difference in pressure, the set of differential pressure values will provide a good picture of the relationship between the corresponding flow velocities.

According to a further embodiment of the invention, one of the pressure values is a static pressure value indicative of a static pressure, and the processing unit is adapted to calculate the set of differential pressure values using the static pressure value as a reference value.

In other words, each differential pressure value is calculated as the difference between one of the pressure values and the reference value, where the reference value is the static pressure value.

According to a further embodiment of the invention, the static pressure value is the pressure value corresponding to the largest height above the trailing edge region.

In other words, the static pressure value is measured at the largest height above the rotor blade surface.

The static pressure value, which is used as a reference value for calculating the set of differential pressure values, may be obtained using a static pressure orifice. In other words, the reference value is not the stagnation pressure of the flow, but rather the intrinsic pressure of the flow at the top of the boundary layer.

Purely as an illustrative example, the pressure sensor may be configured to provide four pressure values $p1$, $p2$, $p3$, and $p4$ corresponding to four different heights $h1$, $h2$, $h3$, and $h4$ above the trailing edge region, where $h4$ is the largest height. In this case, the processing unit may calculate three differential pressure values $dp1$, $dp2$, and $dp3$ as follows: $dp1=p1-p4$, $dp2=p2-p4$, and $dp3=p3-p4$. In this same example, $p4$ could also represent the value of the static pressure of the fluid.

Such a set of differential pressure values provides a simple and yet highly informative picture of the flow velocity distribution, in particular of the difference between flow velocities corresponding to different heights.

According to a further embodiment of the invention, the pressure sensor comprises (a) an air intake unit adapted to be positioned at the trailing edge region of the wind turbine rotor blade and having a plurality of inlet ports, (b) a measurement unit having a plurality of sensor devices, and (c) a guiding unit adapted to provide individual fluid communication channels between each inlet port and a corresponding sensor device, wherein the sensor devices are adapted to generate an electrical signal indicative of the stagnation pressure at the corresponding inlet port.

In other words, the air intake unit is configured to be placed on the rotor blade such that the inlet ports are positioned in the heights above the rotor blade surface corresponding to the respective pressure values. The air intake unit may preferably be placed on the suction side of the wind turbine rotor blade, i.e. the side facing towards the wind turbine tower during normal operation. However, the air intake unit may also be placed on the pressure side or on both the pressure side and suction side. In the latter case, combinations of measurements from both sides may be used.

The measurement device contains the actual sensor devices for obtaining the individual pressure values, preferably as electrical signals.

The air intake unit and the measurement unit are connected by the guiding unit, which provides one fluid communication channel for each pair of inlet port and sensor device.

According to a further embodiment of the invention, the air intake unit is adapted to be mounted on the surface of the wind turbine rotor blade or in an opening extending through the surface of the wind turbine rotor blade. In particular, the air intake unit may be adapted to be mounted on the suction side of the rotor blade at a predetermined distance from the rotation axis of the rotor.

According to a further embodiment of the invention, the measurement unit is adapted to be mounted within a rotor hub of the wind turbine.

According to a further embodiment of the invention, the guiding unit comprises a plurality of tubes adapted to extend through the interior of the wind turbine rotor blade and/or across an exterior part of the wind turbine rotor blade.

In other words, the tubes may extend within the wind turbine rotor blade, across the outer surface of the wind turbine rotor blade, or a combination of both, i.e. partially across the outer surface and partially within the wind turbine rotor blade.

By distributing the units of the pressure sensor such that the air intake unit is located in the relevant position on or in the surface of the rotor blade, the measurement unit with its (electronic) pressure sensors is located within the rotor hub, and the guiding unit extends within and/or across the rotor blade while providing fluid communication between the air intake unit and the measurement unit, it is assured that electric/electronic equipment is only located in the rotor hub and neither on nor in the rotor blades. Thereby, problems relating to lightning conductivity can be effectively avoided.

According to a further embodiment of the invention, plurality of tubes is adapted to extend from the air intake and to a root portion of the wind turbine rotor blade.

According to a further embodiment of the invention, each inlet port of the plurality of inlet ports has an opening having a shape selected from the group consisting of a circular shape, an elliptical shape, a rectangular shape, and a rectangular shape with rounded corners. In the case of a rectangular shape, preferably with rounded corners, this constitutes an opening with essentially four sides, i.e. a pair of substantially parallel longer sides and a pair of substantially parallel shorter sides. The corners of such substantially rectangularly shaped openings are preferably rounded (faired) to minimize the impact on the flow.

According to a further embodiment of the invention, the longer sides of the openings having elliptical or rectangular shapes are substantially parallel to the surface of the wind turbine rotor blade.

Thereby, it is assured that the measured pressure value represents an average of the flow characteristics across the blade in the corresponding height. This is particularly important for wind turbine rotor blades comprising vortex generators arranged across the surface of the rotor blade.

According to a further embodiment of the invention, the length of the longer sides of the openings having elliptical or rectangular shapes is within the range from 1 mm to 200 mm, in particular from 1 mm to 20 mm or from 10 mm to 200 mm, in particular from 5 mm to 15 mm or from 20 mm to 150 mm, in particular from 8 mm to 12 mm or from 30 mm to 100 mm.

With elliptical or rectangular inlet port openings having a width in the range from 10 mm to 200 mm, any effects from vortex generators placed between the leading edge and the air intake unit can be effectively averaged out, such that the pressure value obtained provides a useful representation of the flow characteristics in the corresponding height above the surface of the rotor blade.

If no vortex generators are present, a width in the range from 1 mm to 10 mm may provide excellent results.

According to a second aspect of the invention, there is provided a wind turbine comprising (a) a plurality of rotor blades arranged on a rotor hub, and (b) at least one system according to the first aspect or any of the above described embodiments.

The wind turbine may comprise one system for determining the soiling state for each rotor blade, e.g. three systems. In some embodiments, more than one system may be used for each rotor blade. For example, each rotor blade may be equipped with two systems, one for measuring pressure values at a first position in the length direction of the rotor blade, e.g. at 70% radius, and another for measuring pressure values at a second position in the length direction of the rotor blade, e.g. at 50% radius. By averaging or otherwise using both systems, the precision may be further improved.

By taking the soiling state of the rotor blade(s) into account, a wind turbine controller will be able to optimize operation of the wind turbine and to apply safety measures in case of dangerous situations.

According to a third aspect of the invention, there is provided a method of determining a soiling state of a wind turbine rotor blade. The method comprises (a) measuring a plurality of pressure values corresponding to a plurality of different heights above a trailing edge region of the wind turbine rotor blade, and (b) determining the soiling state of the wind turbine rotor blade by estimating an air flow velocity distribution above the trailing edge region of the wind turbine rotor blade based on the plurality of pressure values.

This aspect of the invention is essentially based on the same idea as the first aspect described above.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

BRIEF DESCRIPTION

Some of the embodiments will be described in detail, with reference to the following figures, wherein like designations denote like members, where in:

DETAILED DESCRIPTION

Figure 1:
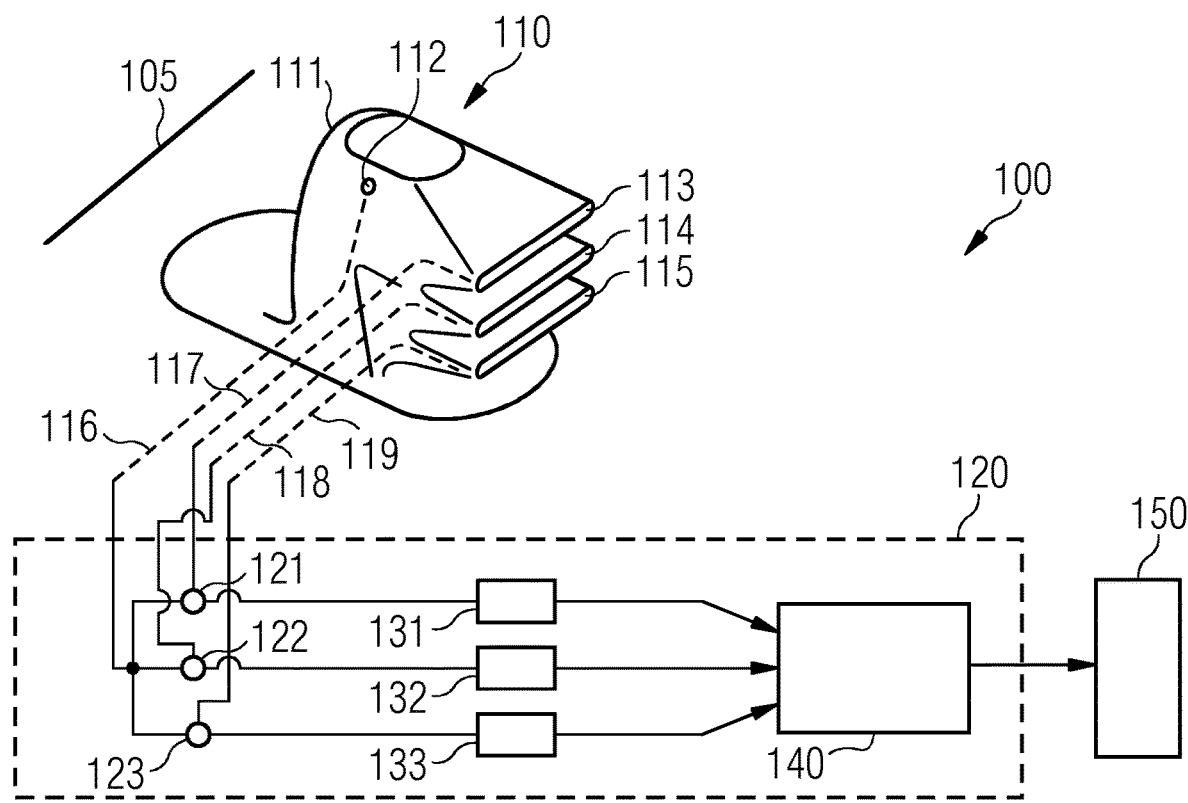
FIG. 1 shows a system according to an embodiment of the present invention.

The illustration in the drawing is schematic. It is noted that in different figures, similar or identical elements are provided with the same reference numerals or with reference numerals which differ only within the first digit.

FIG. 1 shows a system 100 for determining a soiling state of a wind turbine rotor blade according to an embodiment of the present invention. More specifically, the system 100 comprises a pressure sensor 110 and a processing unit 120. The processing unit 120 is in communication with the pressure sensor 110 and a wind turbine controller 150.

The pressure sensor 110 comprises an air intake unit 111 arranged on a surface of a rotor blade in the vicinity of the trailing edge 105 and having a reference inlet port 112 measuring static pressure close to a top portion of the air intake unit 111. The air intake unit 111 further comprises three inlet ports 113, 114, 115 arranged in different heights above the surface of the rotor blade (and below the reference inlet port 112). The reference inlet port 112 feeds entering air into pressure tube 116. Each of the three inlet ports 113, 114, 115 is formed like a substantially rectangular slit extending in parallel with the surface of the rotor blade. The air entering each of the three inlet ports 113, 114, 115 is fed into a corresponding pressure tube 117, 118, 119. The pressure tubes 116, 117, 118, 119 are in fluid communication with respective sensor devices (not shown) which generate an electrical signal indicative of the stagnation pressure at the corresponding inlet port 113, 114, 115 and static pressure at the corresponding inlet port 112. These sensor devices are preferably arranged within a rotor hub of the wind turbine in order to avoid electronic equipment on or within the rotor blade. However, in principle, the sensor devices may also be arranged directly in or close to the air intake unit 111.

The processing unit 120 comprises three subtracting units 121, 122, 123, three calculation units 131, 132, 133, and a determination unit 140. The subtracting unit 121 receives the electrical signal corresponding to the pressure at the reference inlet port 112 and the electrical signal corresponding to the pressure at the (upper) inlet port 113 and calculates a corresponding differential pressure value equal to the difference between the pressure at the inlet port 113 and at the reference inlet port 112. Alternatively, a differential pressure sensor can also be used directly. Similarly, the subtracting unit 122 receives the electrical signal corresponding to the pressure at the reference inlet port 112 and the electrical signal corresponding to the pressure at the (middle) inlet port 114 and calculates a corresponding differential pressure value equal to the difference between the pressure at the inlet port 114 and at the reference inlet port 112. Finally, the subtracting unit 122 receives the electrical signal corresponding to the pressure at the reference inlet port 112 and the electrical signal corresponding to the pressure at the (middle) inlet port 114 and calculates a corresponding differential pressure value equal to the difference between the pressure at the inlet port 114 and at the reference inlet port 112.

In this embodiment, the differential pressure values calculated by the subtracting units 121, 122, 123 are supplied to respective calculation units 131, 132, 133 which calculate corresponding differential flow velocity values based on the differential pressure values and other relevant parameters available, such as air density, barometric pressure, temperature, humidity, etc. However, these calculation units 131, 132, 133 are not absolutely necessary and thus optional, as the soiling state of the blade may also be determined based on the differential pressure values. In the present embodiment, the calculated differential flow velocity values are supplied to the determination unit 140 which analyzes them in order to determine whether (and to which extent) the rotor blade is soiled. If the determination unit 140 determines that the rotor blade is soiled, a corresponding signal is transmitted to the wind turbine controller 150, such that the soiling state can be taken into account.

Figure 2:
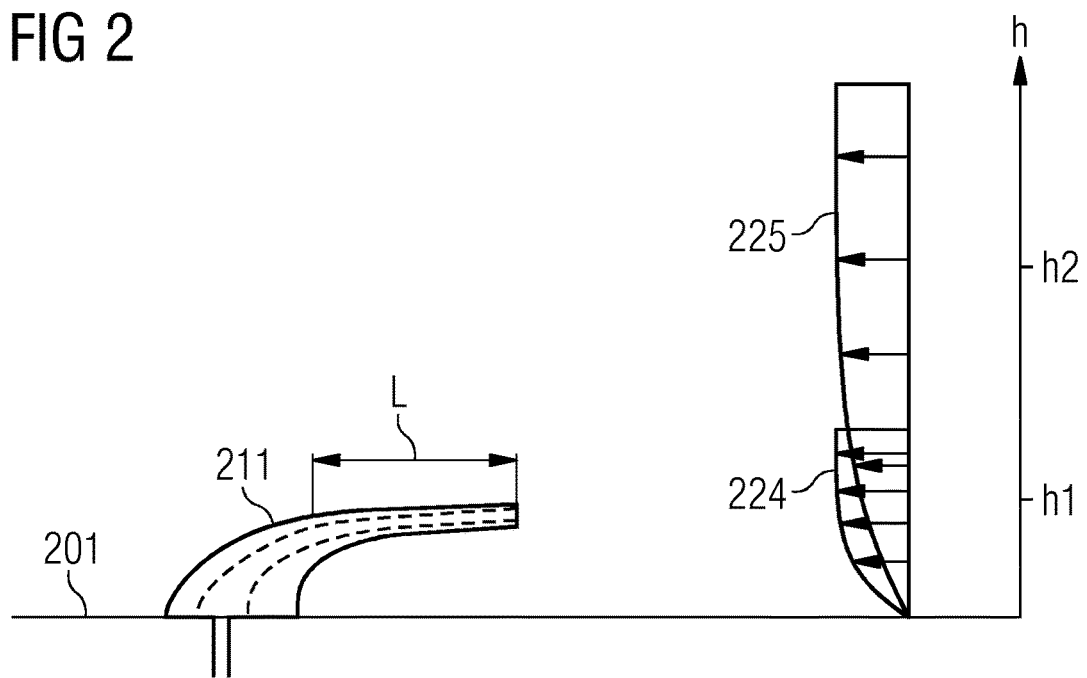
FIG. 2 shows flow velocity distributions respectively corresponding to a soiled and a clean rotor blade.

FIG. 2 shows flow velocity distributions on the surface of the rotor blade 201 corresponding respectively to a soiled and a clean rotor blade. More specifically, FIG. 2 shows an air intake unit 211 arranged on the surface of a rotor blade 201 in the vicinity of the trailing edge. The air intake unit is schematically shown as having a single inlet port with a length L and arranged parallel to the surface of the rotor blade 201 such that it faces the flow across the rotor blade surface flowing from the leading edge to the trailing edge. The flow velocity profile or distribution 224 corresponds to a clean blade, where the boundary layer is relatively thin. As can be seen, the flow velocity is essentially constant from a height of h1 above the rotor blade surface. Below the height h1, the flow velocity converges rapidly towards zero at the rotor blade surface (h=0). In comparison, the flow velocity 225 corresponding to a soiled blade does not reach the constant value until the height h2 which is significantly larger than h1. Thus, the boundary layer is correspondingly larger in this case. The impact on the thickness is used by the present invention, in particular by the determination unit 140 of FIG. 1, to determine the soiling state of the rotor blade 201.

It should be noted that the thickness of the boundary layer is also dependent on the Reynolds number and the angle of attack. Thus, to quantify a measured flow velocity (or pressure) profile, knowledge of these two quantities is required. The Reynolds number can be estimated based on the rotor speed of the wind turbine. The angle of attack can be estimated based on the pitch angle of the rotor blades, the rotor speed and the power output of the wind turbine. All these quantities are readily available from the wind turbine controller (e.g. the controller 150 in FIG. 1) such that the corresponding estimations of the Reynolds number and the angle of attack are straight forward.

Figure 3A:
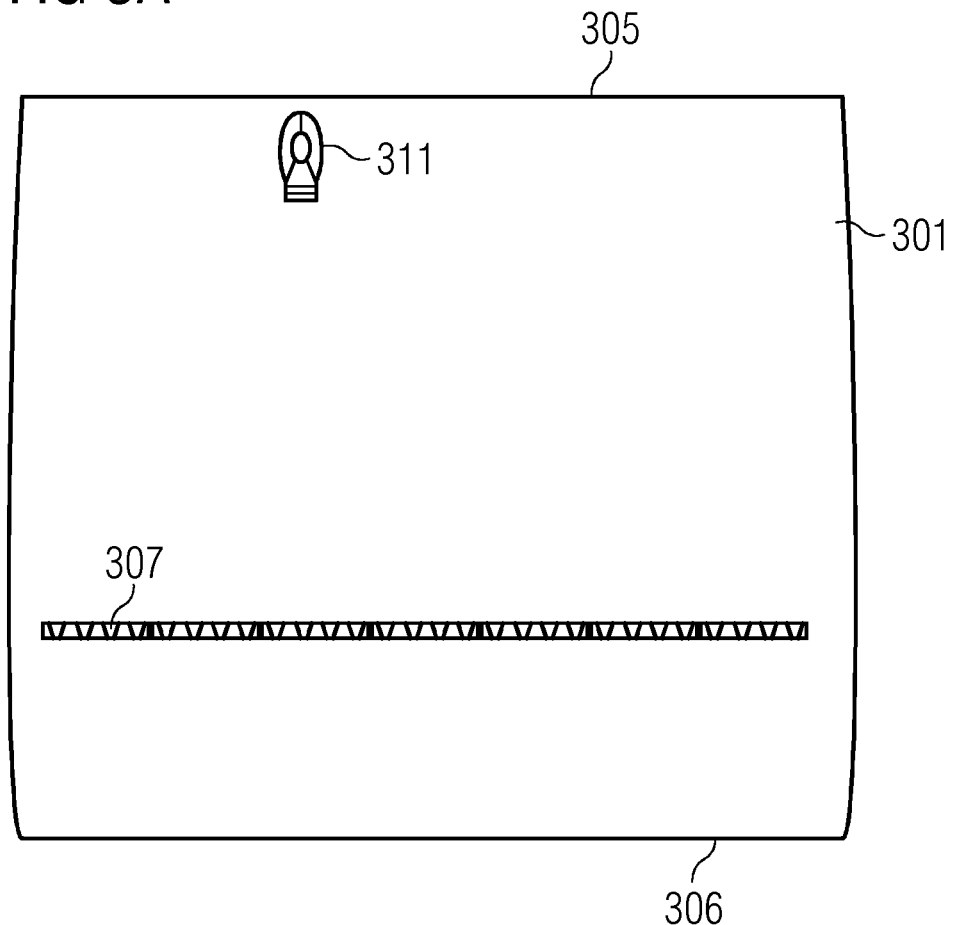
FIG. 3A shows a top view of a rotor blade with a pressure sensor according to an embodiment of the present invention.
Figure 3B:
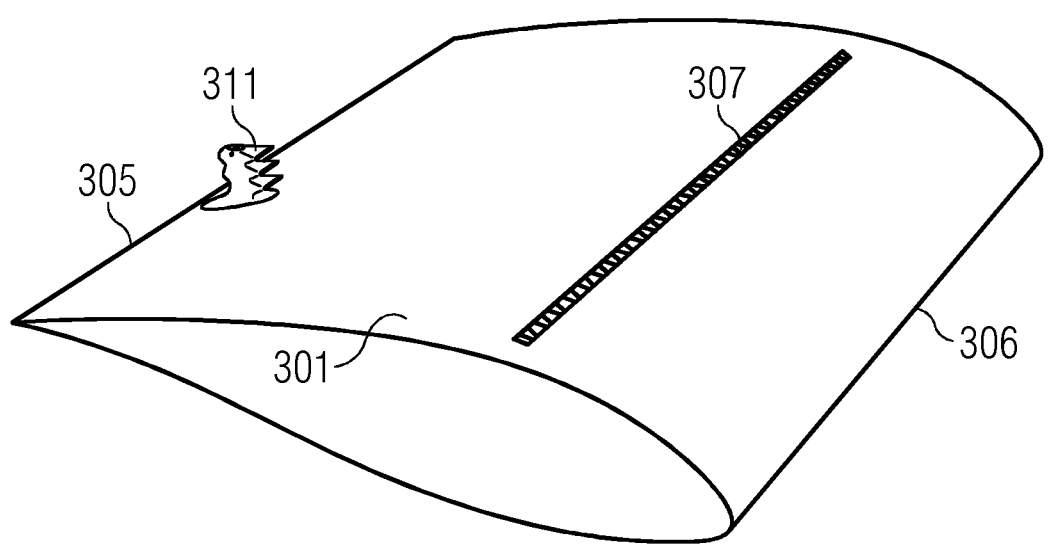
FIG. 3B shows a perspective view of the rotor blade shown in FIG. 3A.
Figure 3C:
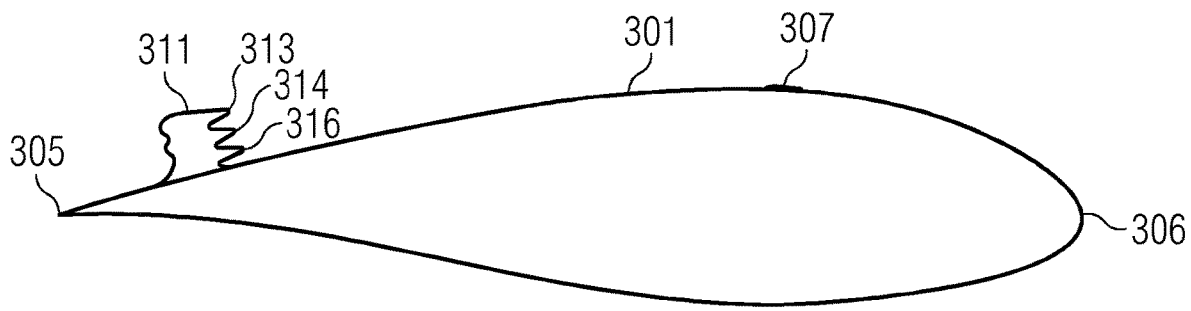
FIG. 3C shows a cross-sectional view of the rotor blade shown in FIG. 3A and FIG. 3B.

FIG. 3A shows a top view, FIG. 3B shows a perspective view and FIG. 3C shows a cross-sectional view of a rotor blade 301 with a pressure sensor according to the present invention. The rotor blade 301 has a trailing edge 305 and a leading edge 306. The air intake unit 311 is arranged on the surface of the rotor blade in the vicinity of the trailing edge 305. As customary in the art, a stripe of vortex generators 307 is arranged across the surface of the rotor blade 301 and in parallel with the leading edge 306. The structure of the air intake unit 311 is similar to that of the air intake unit 111 shown in FIG. 1 and discussed in detail above. Thus, as shown particularly in FIG. 3C, the air intake unit 305 comprises three inlet ports 313, 314, 315 arranged in different heights above the surface of the rotor blade 301. Each inlet port 313, 314, 315 is sufficiently wide to obtain representative measurements by averaging out any influence by the vortex generators 307.

Figure 4:
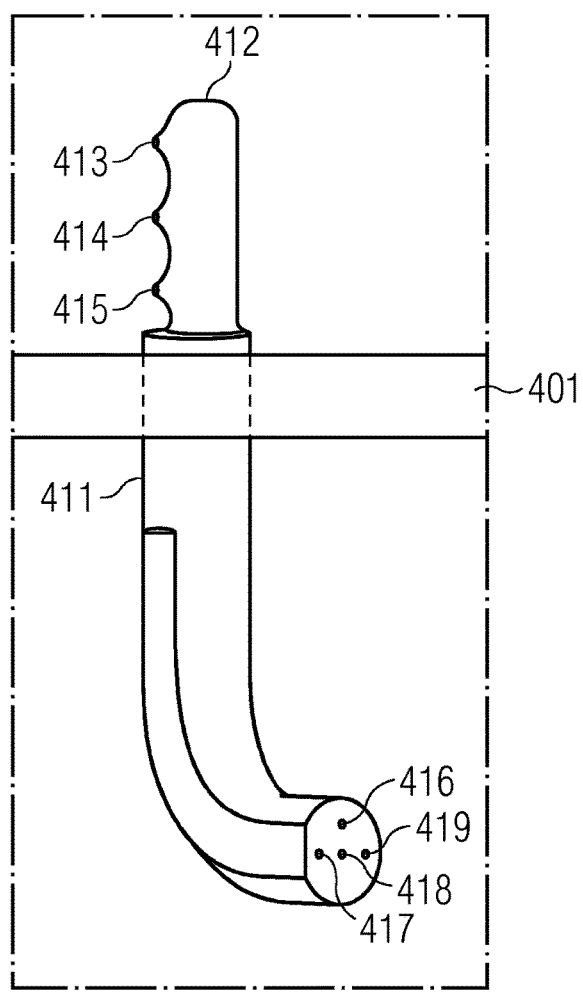
FIG. 4 shows a pressure sensor according to an embodiment of the present invention.

FIG. 4 shows an air intake unit 411 of pressure sensor according to an embodiment of the present invention. The air intake unit 411 differs from the air intake units 111, 211 and 311 shown respectively in FIGS. 1, 2 and 3 in that it is not mounted on the surface of the rotor blade 401 but extends through it. More specifically, the air intake unit 411 is formed as an integral unit to be fixed (from the inside) in a corresponding hole in the rotor blade 401 and also includes tubes 416, 417, 418, 419 respectively connected to the inlet ports 412, 413, 414, 415.

Figure 5:
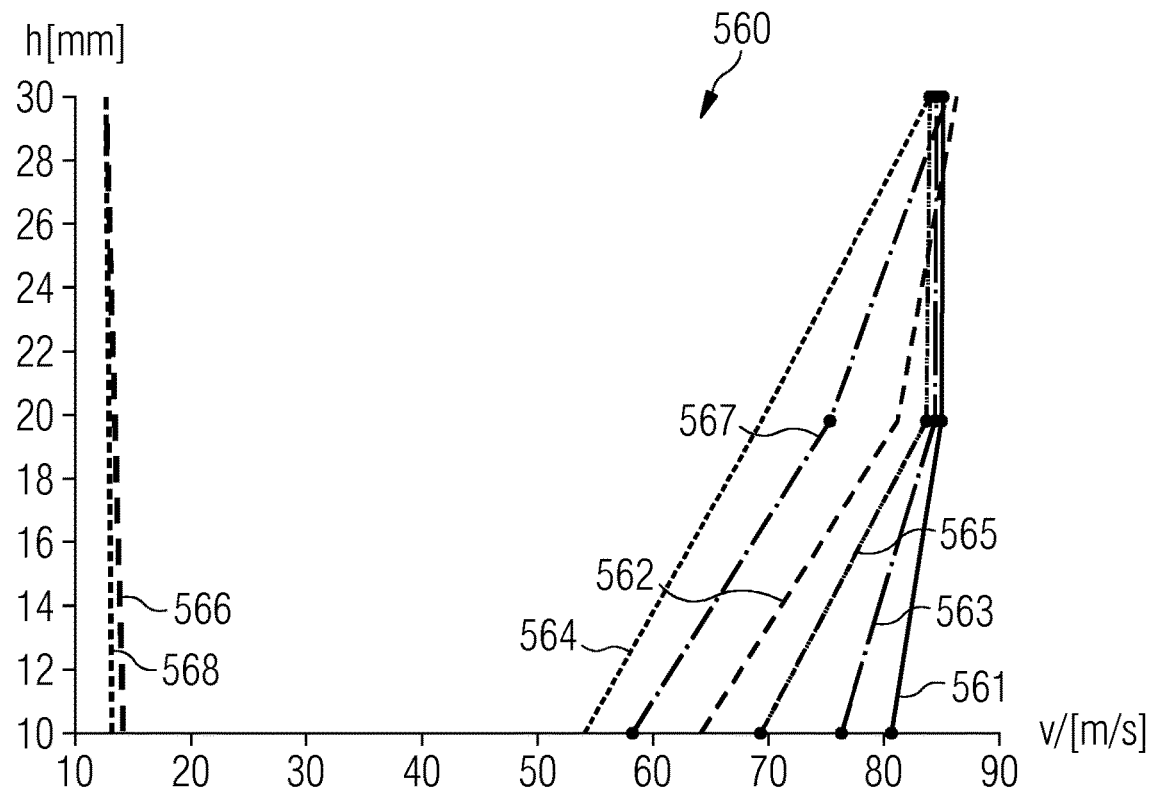
FIG. 5 shows a plurality of flow velocity distributions estimated in accordance with embodiments the present invention.

FIG. 5 shows a graph 560 representing a plurality of flow velocity distributions estimated in accordance with the present invention. To obtain the data, a pressure sensor measuring pressure values in three heights (10 mm, 20 mm, and 30 mm) above the surface of the rotor blade was used. Based on the pressure measurements, the corresponding flow velocities were calculated as discussed above. The curves 561, 562, 563, 564, 565, and 566 shown in the graph 560 were obtained by linear interpolation.

The curve 561 corresponds to measurements for a clean blade with an angle of attack of 4°, while the curve 562 represents a measurement for a soiled blade with an angle of attack of 4°. As can be seen, the flow velocity v is generally higher along the curve 561 in comparison to the curve 562. Furthermore, the curve 561 is much steeper (corresponding to a larger gradient) than the curve 562.

Similarly, the curve 563 corresponds to measurements for a clean blade with an angle of attack of 6°, while the curve 565 represents a measurement for a soiled blade with an angle of attack of 6°. As can be seen, also in this case the flow velocity v is generally higher along the curve 563 in comparison to the curve 564. Furthermore, the curve 563 is much steeper (corresponding to a larger gradient) than the curve 564.

The curve 565 corresponds to measurements for a clean blade with an angle of attack of 8°, while the curve 566 represents a measurement for a soiled blade with an angle of attack of 8°. As can be seen, the flow velocity v exhibits a similar behavior along the curve 565 (clean blade) as the flow velocity represented by curves 561 and 563. The main difference being that the flow velocity is a bit smaller and increases slower along the lower half of curve 565 in comparison to the curves 561 and 563. Turning to the curve 566 for the soiled blade with the same angle of attack (8°), it can be seen that the flow speed is significantly lower (less than 15 m/s). In this case, the soiling causes the blade to stall.

Similarly, the curve 567 corresponds to measurements for a clean blade with an angle of attack of 10°, while the curve 568 represents a measurement for a soiled blade with an angle of attack of 10°. As can be seen, the flow velocity v exhibits a similar behavior along the curve 567 (clean blade) as the flow velocity represented by curve 565, although the flow velocity is smaller and increases slower along the curve 567 in comparison to the curves 565. Turning to the curve 568 for the soiled blade with the same angle of attack (10°), it can be seen that the flow speed is significantly lower (less than 15 m/s). Also in this case, the soiling causes the blade to stall.

Data corresponding to the curves 561, 563, 565, and 567 (clean blades, various angles of attack) may advantageously be stored in a memory of the system (e.g. within determination unit 140 of FIG. 1) to allow for comparison with live data obtained during operation.

Figure 6:
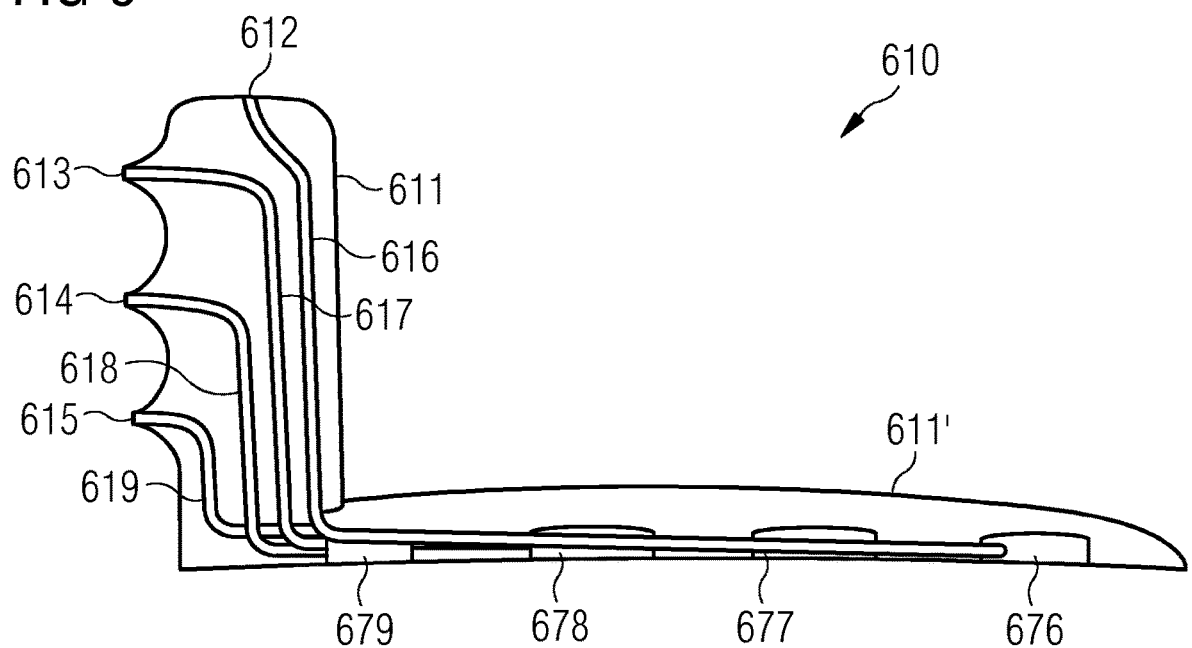
FIG. 6 shows a pressure sensor according to a further embodiment of the present invention.

FIG. 6 shows a pressure sensor 610 according to a further embodiment of the present invention. The structure is generally similar to the previously described embodiments, in that the sensor 610 comprises an air intake unit 611 with inlet ports 612, 613, 614, 615 arranged in different heights. However, in the present embodiment, the air intake unit 611 comprises a longitudinal foot 611' in which pressure sensor devices 676, 677, 678, and 679 are arranged. The sensor devices 676, 677, 678, and 679 are in fluid communication with the inlet ports 612, 613, 614, 615 through respective pressure tubes 616, 617, 618, 619 and generate electrical signals indicative of the pressure at the corresponding inlet port.

In general, the inlet ports of the pressure sensors described above are designed such that moisture entering the port (e.g. due to rain) is ejected, e.g. through drain holes, prior to the pressure sensor device. As an alternative to drain holes, the opening of each pressure channel can be made in such a way that water is always ejected due to the centrifugal forces from blade rotation.

The system may also be combined with a purge system, such that air is blown from the rotor hub in order to purge all humidity that may be accumulated in the holes and/or to purge dust which may clog the inlet ports.

Except for any parts that have to be able to conduct electricity, the pressure sensor is preferably made from non-conductive materials, such as plastics.

When, by means of the system and methods disclosed herein, it is detected that one or more rotor blades is soiled, the wind turbine controller (e.g. the controller 150 in FIG. 1) may handle the situation in a number of ways, such as (i) change the settings for operating the wind turbine in view of the soiling, (ii) request an operator to perform a blade washing, (iii) consider the soiling as vital information during a power curve campaign measurement, (iv) operate the wind turbine less aggressively to reduce the risk of stall, and (v) operate the wind turbine less aggressively to reduce the noise emission.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A system for determining a soiling state of a wind turbine rotor blade, the system comprising:
 a pressure sensor configured to measure a plurality of pressure values corresponding to a plurality of different heights above a trailing edge region of the wind turbine rotor blade; and
 a processing unit in communication with the pressure sensor and configured to determine the soiling state of the wind turbine rotor blade by estimating an air flow velocity distribution above the trailing edge region of the wind turbine rotor blade based on the plurality of pressure values.

2. The system according to claim 1, wherein the processing unit is configured to calculate a set of differential pressure values based on the plurality of pressure values and to estimate the air flow velocity distribution based on the set of differential pressure values.

3. The system according to claim 2, wherein one of the pressure values is a static pressure value indicative of a static pressure, and wherein the processing unit is configured to calculate the set of differential pressure values using the static pressure value as a reference value.

4. The system according to claim 3, wherein the static pressure value is the pressure value corresponding to a largest height above the trailing edge region.

5. The system according to claim 1, wherein the pressure sensor comprises:
 an air intake unit configured to be positioned at the trailing edge region of the wind turbine rotor blade and having a plurality of inlet ports,
 a measurement unit having a plurality of sensor devices, and
 a guiding unit configured to provide individual fluid communication channels between each inlet port and a corresponding sensor device,
 wherein the plurality of sensor devices are configured to generate an electrical signal indicative of a stagnation pressure at the corresponding inlet port.

6. The system according to claim 5, wherein the air intake unit is configured to be mounted on a surface of the wind turbine rotor blade or in an opening extending through the surface of the wind turbine rotor blade, further wherein the air intake unit is configured to be mounted on a suction side of the wind turbine rotor blade at a predetermined distance from a rotation axis of a rotor.

7. The system according to claim 5, wherein the measurement unit is configured to be mounted within a rotor hub of a wind turbine.

8. The system according to of claim 5, wherein the guiding unit comprises a plurality of tubes configured to extend through an interior of the wind turbine rotor blade and/or across an exterior part of the wind turbine rotor blade.

9. The system according to claim 8, wherein the plurality of tubes are configured to extend from the air intake and to a root portion of the wind turbine rotor blade.

10. The system according to claim 5, wherein each inlet port of the plurality of inlet ports has an opening having a shape selected from the group consisting of: a circular shape, an elliptical shape, a rectangular shape, and a rectangular shape with rounded corners.

11. The system according to claim 10, wherein longer sides of the openings having elliptical or rectangular shapes that are parallel to a surface of the wind turbine rotor blade.

12. The system according to claim 11, wherein a length of the longer sides of the openings having elliptical or rectangular shapes is within a range from 1 mm to 200 mm.

13. A wind turbine comprising
 a plurality of rotor blades arranged on a rotor hub; and
 at least one system according to claim 1, the at least one system being configured to determine the soiling state of one of the rotor blades.

14. A method of determining a soiling state of a wind turbine rotor blade, the method comprising:
 measuring a plurality of pressure values corresponding to a plurality of different heights above a trailing edge region of the wind turbine rotor blade; and
 determining the soiling state of the wind turbine rotor blade by estimating an air flow velocity distribution above the trailing edge region of the wind turbine rotor blade based on the plurality of pressure values.

* * * * *